US007632019B2

(12) United States Patent
Gilbertson

(10) Patent No.: US 7,632,019 B2
(45) Date of Patent: Dec. 15, 2009

(54) IDLER ROLLER ASSEMBLY EMPLOYING SELF-SECURING BEARING RETAINER

(75) Inventor: James R. Gilbertson, Oakdale, MN (US)

(73) Assignee: Carestream Health, Inc., Rochester, NY (US)

( * ) Notice: Subject to any disclaimer, the term of this patent is extended or adjusted under 35 U.S.C. 154(b) by 547 days.

(21) Appl. No.: 11/610,047

(22) Filed: Dec. 13, 2006

(65) Prior Publication Data

US 2008/0145099 A1 Jun. 19, 2008

(51) Int. Cl.
*F16C 17/00* (2006.01)

(52) U.S. Cl. ....................... 384/295; 384/276; 384/419; 384/439

(58) Field of Classification Search ................. 384/276, 384/295, 296, 428, 439, 416–418; 399/117; 411/508; 403/326
See application file for complete search history.

(56) References Cited

U.S. PATENT DOCUMENTS 2,424,757 A 7/1947 Klumpp
2,884,283 A 4/1959 Korol et al.
3,065,035 A 11/1962 Biesecker
3,372,960 A 3/1968 Fisher
3,808,661 A * 5/1974 Carlsson ..................... 384/439
4,624,585 A 11/1986 Nix et al.
4,675,937 A 6/1987 Mitomi
4,850,584 A * 7/1989 Watashi ...................... 384/218
4,887,331 A 12/1989 Thomas
5,061,091 A 10/1991 Shiratori
6,058,280 A 5/2000 Kumar et al.
6,209,175 B1 * 4/2001 Gershenson ................ 411/508
6,467,965 B1 10/2002 Wyer
6,530,692 B2 3/2003 Wyer
6,692,000 B2 * 2/2004 Borne et al. ................ 384/119

* cited by examiner

*Primary Examiner*—Thomas R Hannon

(57) ABSTRACT

A bearing retainer including a flange having a front surface and a rear surface, a hub extending from the front surface and having an exterior surface configured to receive and support a looped extension spring and having an interior forming a bearing pocket, and at least one resilient finger initially extending from the rear surface and having a curve so as to extend toward and beyond the front surface and including at least one retainer tab extending from a surface opposite the hub and positioned on the rear surface side relative to the flange. The resilient finger is configured to be deflectable from a free position toward the hub in response to a deflection force to enable a portion of the resilient finger including the retainer tab to be inserted through an opening in a wall and to substantially return to the free position upon release of the deflection force such that the wall is held between the retainer tab and rear surface, thereby securing the bearing retainer within the opening.

29 Claims, 9 Drawing Sheets

IDLER ROLLER ASSEMBLY EMPLOYING SELF-SECURING BEARING RETAINER

FIELD OF THE INVENTION

The invention relates generally to the field of imaging, and in particular to an imaging apparatus employing an idler roller system. More specifically, the invention relates to an imaging apparatus with an idler roller assembly employing a self-securing bearing retainer.

BACKGROUND OF THE INVENTION

Light sensitive photothermographic film is used in many applications ranging from photocopying apparatuses to graphic arts to medical imaging systems. For example, laser imagers are widely employed in the field of medical imaging to produce visual representations on photothermographic film of digital image data generated by various scanners, such as magnetic resonance imaging (MRI) scanners and computer tomography (CT) scanners. Laser imagers typically include some type of film supply system, a film exposure system, a film processing system, and a transport system that moves and guides film through the laser imager along a transport path from the supply system and through the exposure and processing systems to an output.

Transport systems generally employ one or more spring-loaded roller sets that form a portion of and transport film along the transport path through the laser imager. Such roller sets typically consist of a urethane coated drive roller and some type of idler roller system including a urethane coated idler roller which is held in contact with the drive roller. One such idler roller system includes a bearing retainer which holds a bearing and fits into and slides in an opening in a side wall of the imaging apparatus. A shaft of the idler roller extends through the bearing and bearing retainer and includes one machined groove, adjacent to the bearing retainer and positioned exterior to the imaging apparatus and one machined shoulder adjacent to the bearing retainer but within an interior of the imaging apparatus. To secure the bearing retainers and shaft within the imaging apparatus, a clip, or e-ring, is installed in the machined grooves on each end of the idler roller shaft.

While such an idler roller system is effective at securing the bearing and idler roller, the use of multiple e-rings and corresponding grooves make it relatively costly to manufacture and the cumbersome nature of installation makes it relatively costly to assemble. In light of the above, there is a need for an improved idler roller system and, in particular, an improved bearing retainer.

SUMMARY OF THE INVENTION

An object of the present invention is to provide a bearing retainer having a reduced number of components so as to decrease manufacturing costs.

Another object of the present invention is to provide a bearing retainer which simplifies installation processes so as to decrease assembly costs.

These objects are given only by way of illustrative example, and such objects may be exemplary of one or more embodiments of the invention. Other desirable objectives and advantages inherently achieved by the disclosed invention may occur or become apparent to those skilled in the art. The invention is defined by the appended claims.

According to one aspect of the invention, there is provided a bearing retainer. The bearing retainer includes a flange having a front surface and a rear surface, a hub extending from the front surface and having an exterior surface to receive and support a looped extension spring and having an interior forming a bearing pocket, and at least one resilient finger initially extending from the rear surface and having a curve so as to extend toward and beyond the front surface and including at least one retainer tab extending from a surface opposite the hub and positioned on the rear surface side relative to the flange. The resilient finger is configured to be deflectable from a free position toward the hub in response to a deflection force to enable a portion of the resilient finger including the retainer tab to be inserted through an opening in a wall and to substantially return to the free position upon release of the deflection force such that the wall is held between the retainer tab and rear surface, thereby securing the bearing retainer within the opening.

According to once aspect of the invention, the hub includes a spring retainer flange extending radially outward from an end of the hub opposite the front major surface of the flange. According to one aspect of the invention, the hub is positioned so as to limit deflection of the at least one resilient retainer finger from the free position to a distance less than a distance which would cause permanent deformation of the at least one resilient retainer finger.

According to one aspect of the invention, the bearing retainer includes a frame element extending from the rear major surface, wherein the frame element is configured to extend through the opening when the bearing retainer is secured within the opening and is configured with dimensions to provide a sliding fit within the opening.

According to one aspect of the invention, the bearing pocket is configured to receive and hold a bearing via an opening in the rear surface. According to one aspect of the invention, the bearing is configured to receive a shaft via the opening, and wherein the shaft is free to rotate within the bearing.

According to one aspect of the invention, the bearing pocket is configured as a bearing and is configured to receive a shaft via an opening in the rear surface, and wherein the bearing pocket is configured to support the shaft and to allow rotation of the shaft therein.

According to one aspect of the invention, the bearing retainer is formed from a single piece of material. According to one aspect of the invention, the bearing retainer comprises a plastic material. According to one aspect of the invention, the bearing retainer comprises an anti-static polycarbonate.

BRIEF DESCRIPTION OF THE DRAWINGS

The foregoing and other objects, features, and advantages of the invention will be apparent from the following more particular description of the embodiments of the invention, as illustrated in the accompanying drawings. The elements of the drawings are not necessarily to scale relative to each other.

DETAILED DESCRIPTION OF THE INVENTION

Figure 1:
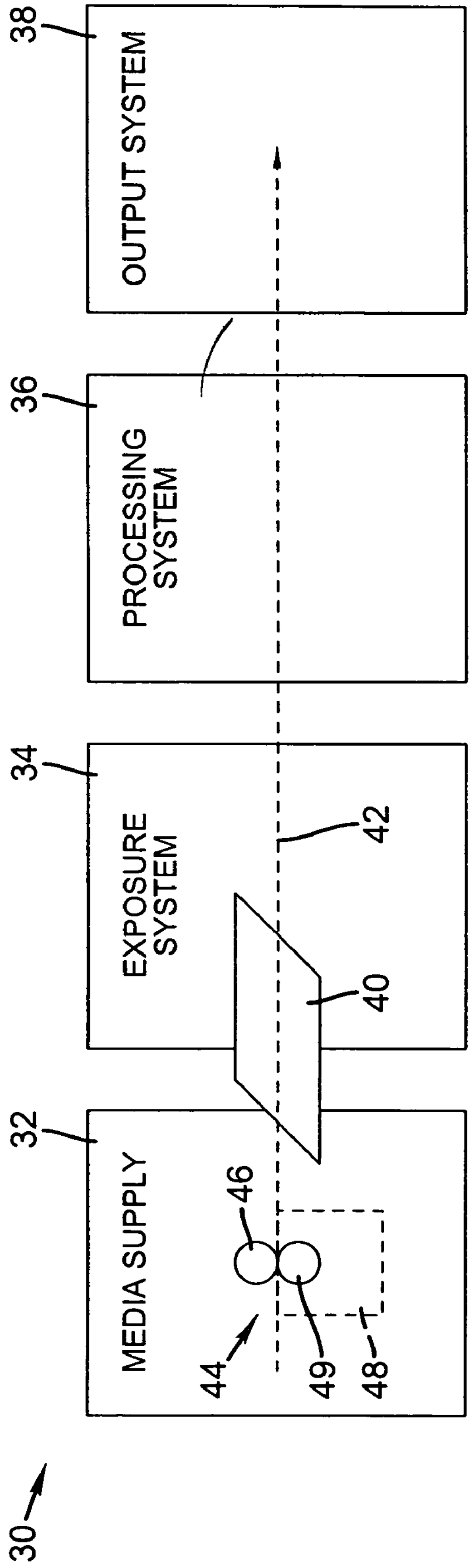
FIG. 1 illustrates a block diagram illustrating an example of an imaging apparatus employing an idler roller system assembly according to the present invention.

The following is a detailed description of the preferred embodiments of the invention, reference being made to drawings in which the same reference numerals identify the same elements of structure in each of the several figures.

FIG. 1 is a block diagram illustrating generally an imaging apparatus 30 employing a bearing retainer and idler roller assembly according to embodiments of the present invention. Imaging apparatus 30 includes a media supply system 32, an exposure system 34, a processing system 36, and an output system 38. In operation, media supply system 32 provides an unexposed imaging media, such as film 40, to exposure system 34 along a transport path 42 (indicated by dashed line). Exposure system 34 subsequently exposes a desired photographic image on film 40 based on image data (e.g. digital or analog) to form a latent image of the desired photographic image on film 40. In one embodiment, exposure system 34 comprises a laser imager.

Processing system 36 receives exposed film 40 from exposure system 34 and develops the latent image thereon. In one embodiment, processing system 36 comprises a thermal processor, such as a drum-type processor, which heats exposed film 40 to thermally develop the latent image. Processing system 36 subsequently cools and delivers the developed film along transport path 42 to output system 38 (e.g. an output tray, sorter) for access by a user. Imaging apparatus 30 employs at least one roller set 44 having a drive roller 46 and an idler roller assembly 48, according to embodiments of the present invention, including an idler roller 49 which, together with drive roller 46 form a portion of a transport path 42.

Figure 2:
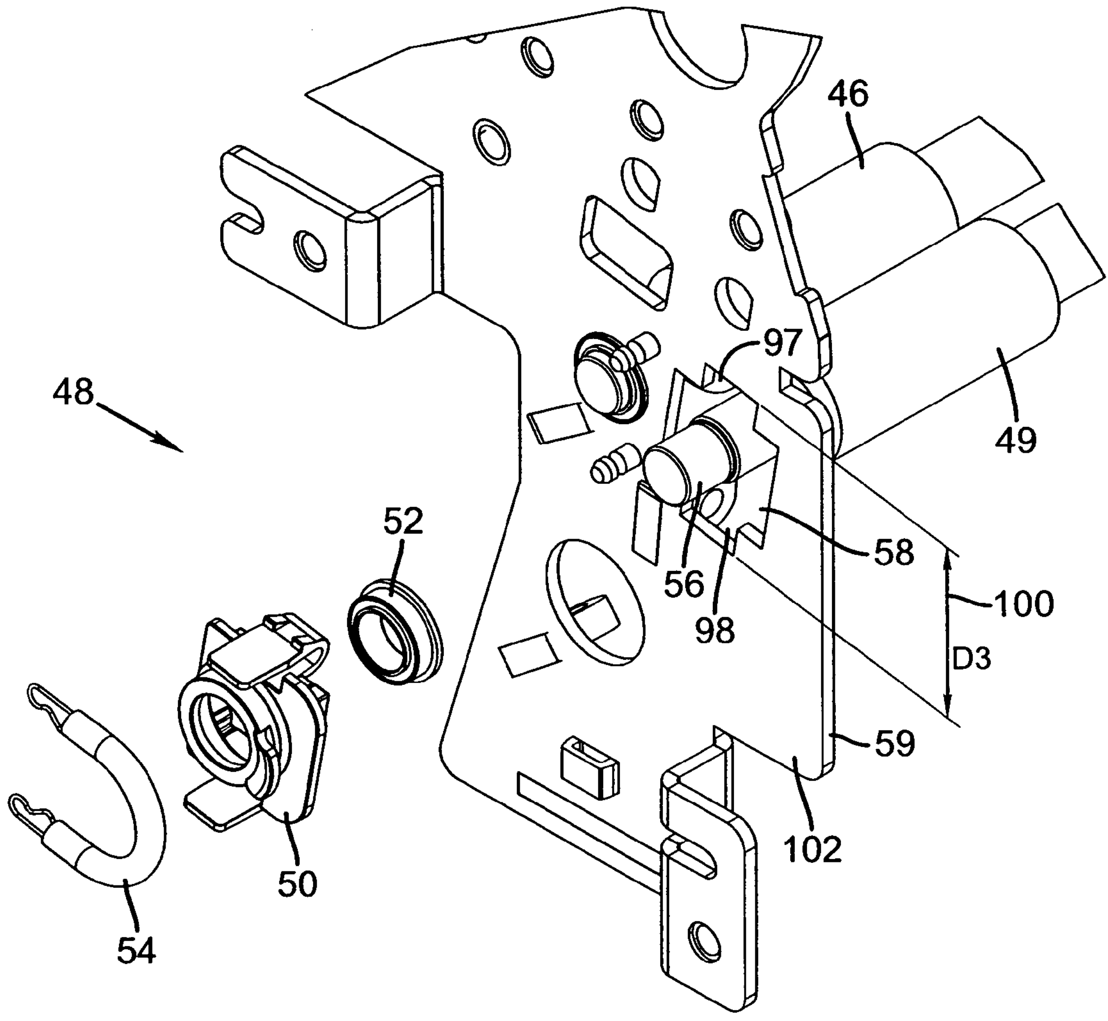
FIG. 2 illustrates an exploded view illustrating one embodiment of an idler roller system according to the present invention.

FIG. 2 is an exploded view of one embodiment of idler roller assembly 48 according to embodiments of the present invention. In one embodiment, in addition to idler roller 49, idler roller assembly 48 includes a bearing retainer 50, a bearing 52, and an extension spring 54. In one embodiment, bearing retainer 50 is configured to receive and retain bearing 52, which in-turn is configured to receive and enable rotation of a shaft 56 of idler roller 49 therein. As will be described in greater detail below, bearing retainer 50 is further configured to "snap into" and retain itself within an opening 58 in an endplate 59 of an imaging apparatus, such as imaging apparatus 30, and is configured to engage and be biased by extension spring 54 so as to maintain contact between idler roller 49 and drive roller 46.

Figure 3:
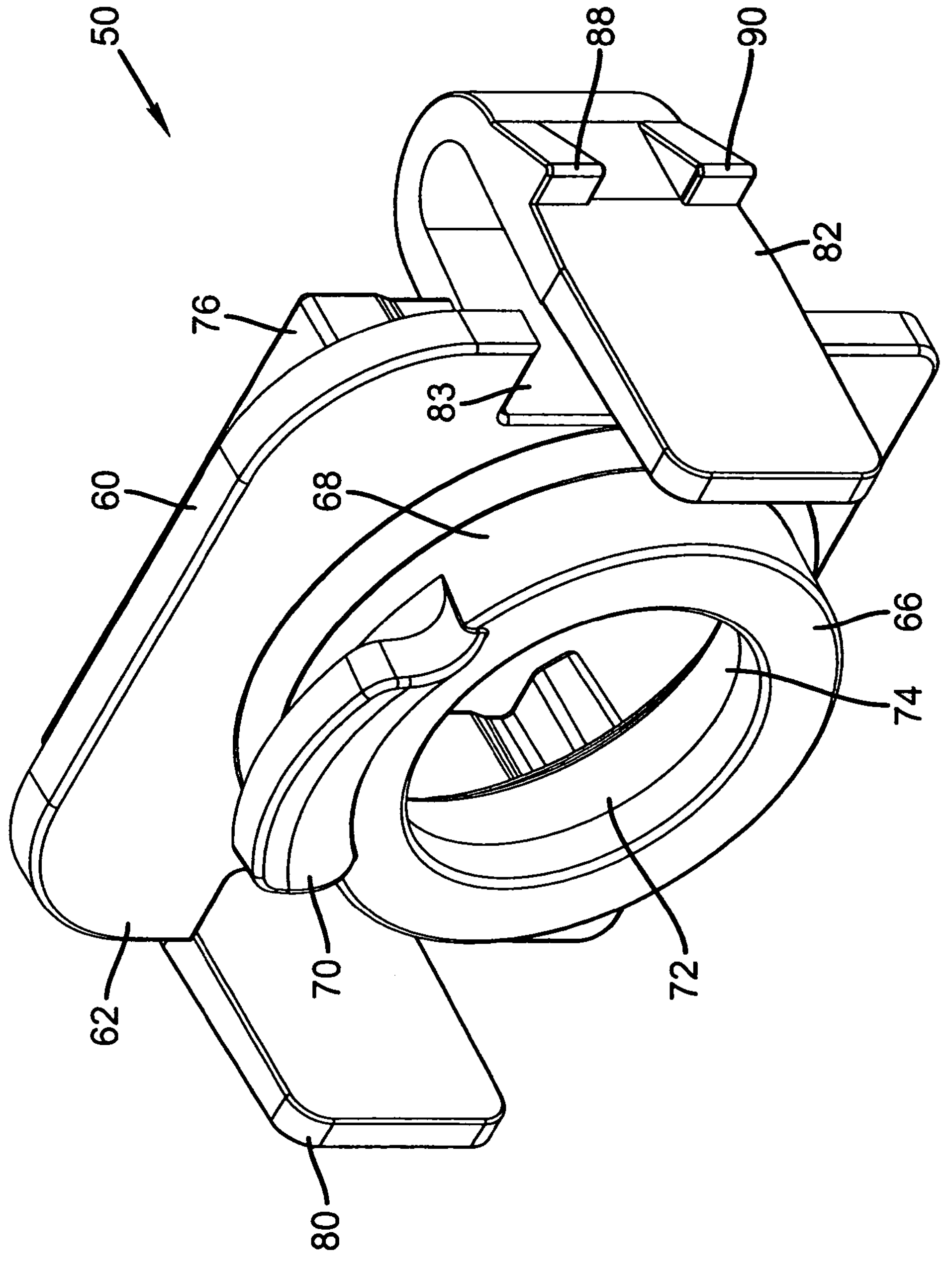
FIG. 3 illustrates a front perspective view of one embodiment of a bearing retainer of the idler roller system of FIG. 2.
Figure 4:
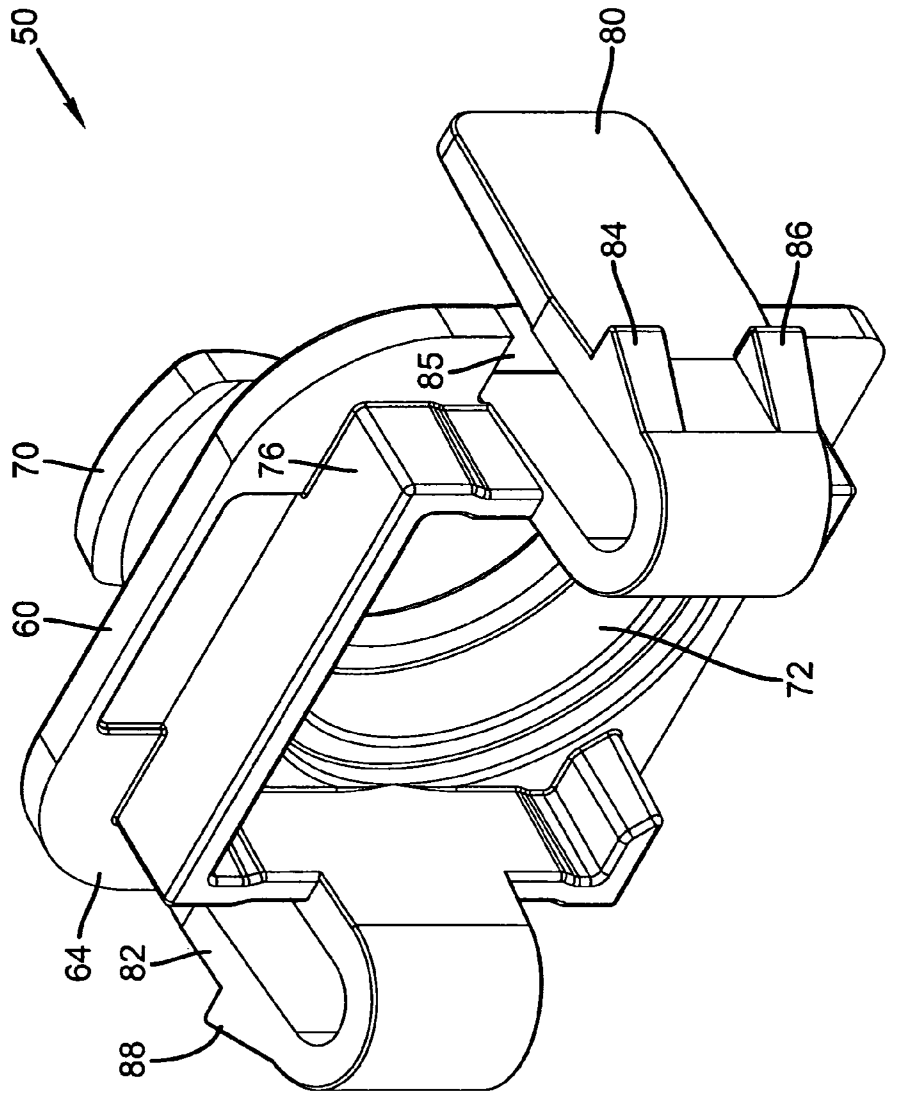
FIG. 4 illustrates a rear perspective view of the bearing retainer of FIG. 3.

FIGS. 3 and 4 respectively illustrate front and rear perspective views of one embodiment of bearing retainer 50. Bearing retainer 50 includes a flange 60 having a front surface 62 and a rear surface 64. A cylindrical hub 66 extends from front surface 62 of flange 60. An exterior surface 68 of hub 66 serves a spring seat and is configured to receive and hold looped extension spring 54. In one embodiment, hub 66 includes a spring retainer tab 70 extending radially outward from hub 66 and which is configured to retain looped extension spring 54 in a position about exterior surface 68 of hub 66. An interior of hub 66 forms a bearing pocket 72 that is configured to receive and hold bearing 52. In one embodiment, bearing pocket 72 is cylindrical in shape and configured to receive an annular or toroidal-shaped bearing 52. In one embodiment, bearing pocket 72 by itself is configured as a bearing for shaft 56 of idler roller 49. In one embodiment, hub 66 includes an opening 74 through which shaft 56 extends when installed within bearing pocket 72.

A frame element 76 extends from rear surface 64 of flange 60 and is configured to slideably insert and extend through opening 58 (see FIG. 1 and FIG. 8 below) in endplate 59. In one embodiment, as illustrated, frame element 76 is substantially rectangular in shape and is positioned about a perimeter of bearing pocket 72. In one embodiment, frame element 76 is incrementally smaller in dimension than opening 58 so as to provide what is generally referred to as a "sliding fit" within opening 58.

In one embodiment, bearing retainer 50 includes first and second resilient fingers 80 and 82. First and second resilient fingers 80 and 82 initially extend outward from rear surface 64 of flange 60 (see FIG. 3), then curve and extend forward and beyond the front surface 62 of flange 60 (see FIG. 4). In one embodiment, as illustrated, first and second resilient fingers 80 and 82 are positioned radially opposite one another relative to hub 66.

First and second resilient fingers 80 and 82 each include at least one retainer tab extending outward from a surface opposite hub 66. In one embodiment, as illustrated, first resilient finger 80 includes retainer tabs 84 and 86 and second resilient finger 82 includes retainer tabs 88 and 90. First and second resilient fingers 80 and 82, along with their corresponding retainer tabs, are configured so to be deflectable toward hub 66 from a normally "free" or non-compressed position where first and second resilient fingers 80 and 82 are spaced from hub 66. In one embodiment, flange 60 includes notches 83 and 85 into which first and second resilient fingers 80 and 82 respectively travel when deflected from their non-compressed position (see FIG. 5B below).

Figure 5A:
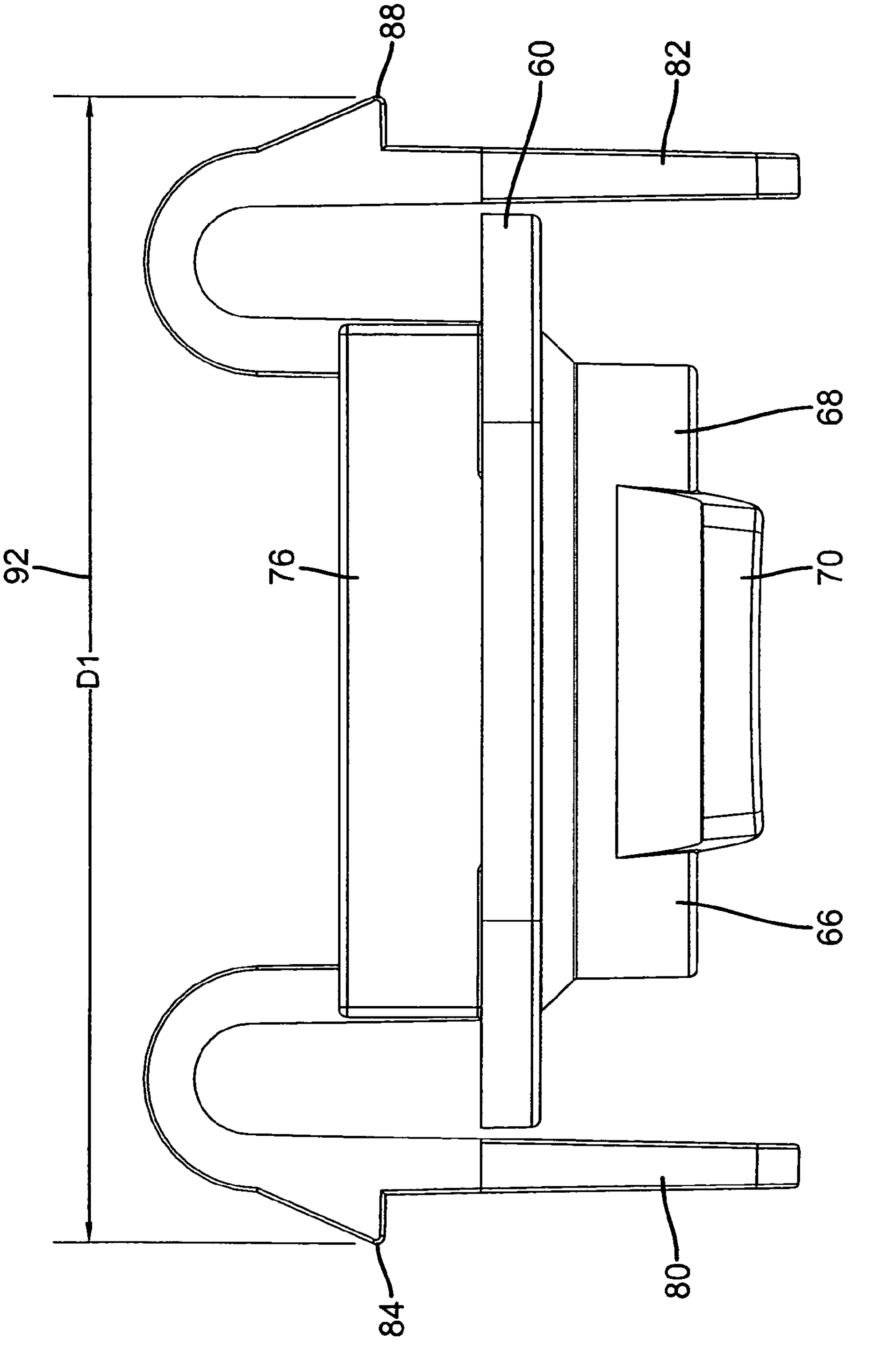
FIG. 5A illustrates a side view of the bearing retainer of FIGS. 2-4.
Figure 5B:
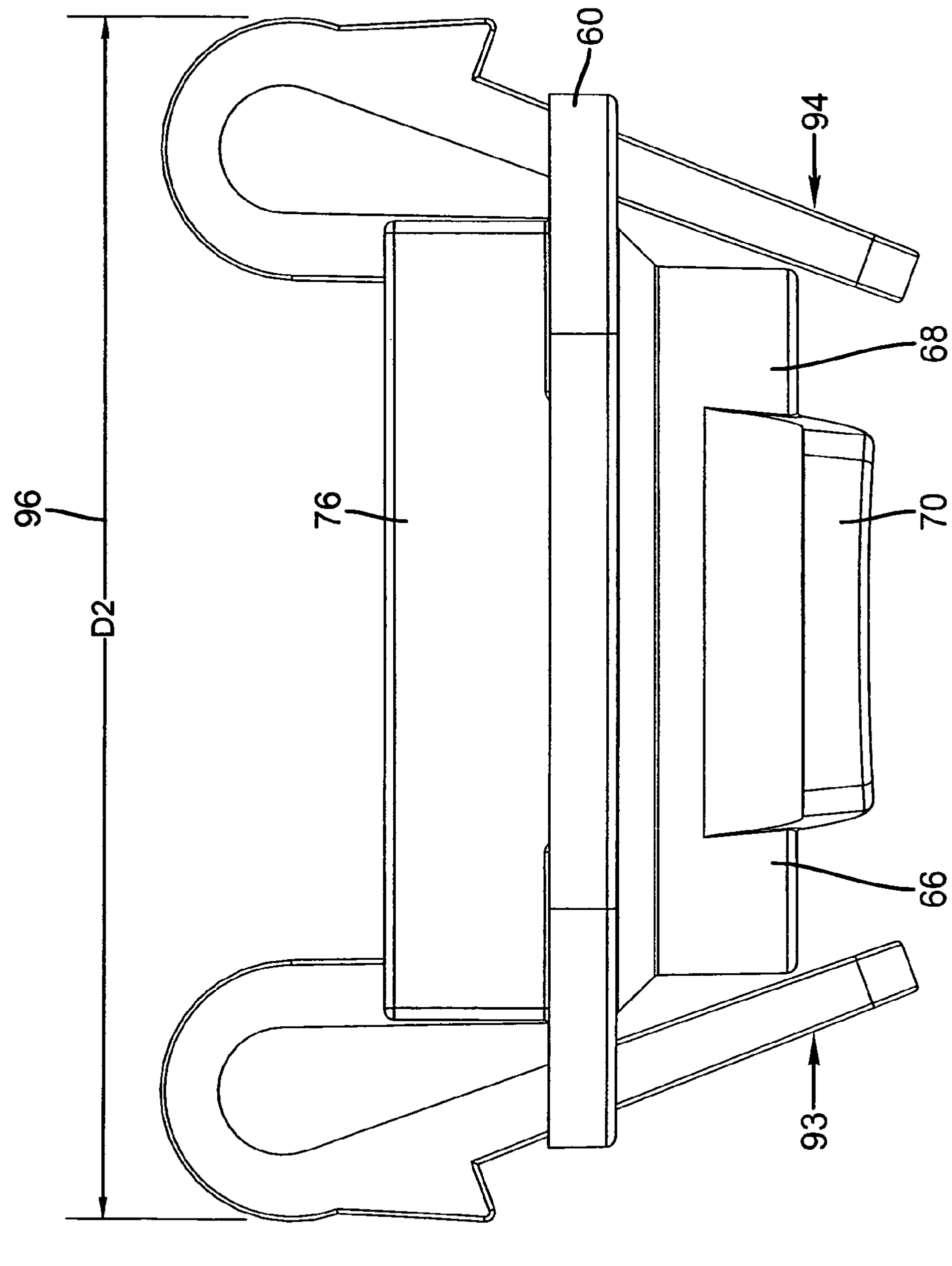
FIG. 5B illustrates a side view of the bearing retainer of FIGS. 2-4.

FIGS. 5A and 5B are side views of bearing retainer 50 respectively illustrating first and second resilient fingers 80 and 82 in a free position and a deflected position. In one embodiment, as illustrated by FIG. 5A, when in the free position, first and second resilient fingers 80 and 82 are substantially parallel to longitudinal axis of hub 66. When in the free position, a distance between the outermost points of retainer tabs 84 and 86 of first resilient finger 80 and retainer tabs 88 and 90 of second resilient finger 82 is indicated as D1 92. With reference to FIG. 5B, in response to compression forces 93 and 94, first and second resilient fingers 80 and 82 deflect from the free position toward hub 66 such that a distance D2 96 between the outermost points of retainer tabs 84 and 86 of first resilient finger 80 and retainer tabs 88 and 90 of second resilient finger 82 is less than distance D1 92. When compression forces 93 and 94 are removed, first and second resilient fingers 80 and 82 return to the free position illustrated by FIG. 5A.

In one embodiment, bearing retainer 50 comprises a plastic material. In one embodiment, bearing retainer 50, including flange 60, hub 66, frame element 76, and first and second resilient fingers 80 and 82, is formed from a contiguous piece of material. In one embodiment, bearing retainer 50 is formed using an electro-static discharging polycarbonate material so as to prevent static build-up during transport of film 40 along transport path 42. In one embodiment, bearing retainer 50 comprises anti-static acetal plastic.

As typically defined, a material's yield strength or yield point refers to a stress point of the material. Upon application of a stress which is below the yield point, the material will elastically deform and return to its original shape when the applied stress is removed. However, if the yield point is exceeded, some fraction of the deformation will be permanent and non-reversible. In one embodiment, as illustrated by FIG. 5B, as first and second resilient fingers 80 and 82 are compressed and travel into corresponding notches 83 and 85 in flange 60, hub 66 is positioned and configured to prevent "over-deflection" of first and second resilient fingers 80 and 82 so that their yield point is not exceeded during installation of bearing retainer 50 in opening 58 of endplate 59.

Returning to FIG. 2, idler roller assembly 48 is illustrated in an exploded view with bearing retainer 50 illustrated in an un-installed position. In one embodiment, opening 58 includes notches 97 and 98 corresponding to and respectively configured to receive first and second resilient fingers 80 and 82 of bearing retainer 50 and having a distance between outside edges of D3 100. It is noted that distance D3 100 is less than distance D1 between the outermost points of retainer tabs 84 and 86 of first resilient finger 80 and retainer tabs 88 and 90 of second resilient finger 82 when in the free position (see FIG. 5A).

In one embodiment, to assemble idler roller assembly 48, idler roller 49 is positioned such that shaft 56 extends through opening 58. Bearing 52 is positioned within bearing pocket 72 inside hub 66 and bearing retainer 50 is slid onto shaft 56 such that shaft 56 extends through bearing 52 and opening 74 in the end of hub 66. Compression forces 93 and 94 are applied to deflect first and second resilient fingers 80 and 82 toward hub 66 until distance D2 96 between outermost points of retainer tabs 84 and 86 and retainer tabs 88 and 90 is less than distance D3 100 between outside edges of notches 97 and 98. Subsequently, first and second resilient fingers 80 and 82 are inserted into corresponding notches 97 and 98 and frame element 76 is inserted through opening 58 until rear surface 64 of flange 60 contacts an exterior surface 102 of endplate 59, at which point retainer tabs 84 and 86 and 88 and 90 have respectively passed through corresponding notches 97 and 98. It is noted that flange 60 has dimensions exceeding those of a main portion (excluding notches 97 and 98) of opening 58.

Compression forces 93 and 94 are subsequently removed such that first and second resilient fingers 80 and 82 substantially return to the free position so that distance D1 between outermost points of retainer tabs 84 and 86 and retainer tabs 88 and 90 is greater than distance D3 100 between outside edges of notches 97 and 98. At this point, endplate 59 is retained between rear surface 64 of flange 60 and retainer tabs retainer tabs 84, 86, 88, and 90 such that bearing retainer 50 is secured within opening 58.

Figure 6:
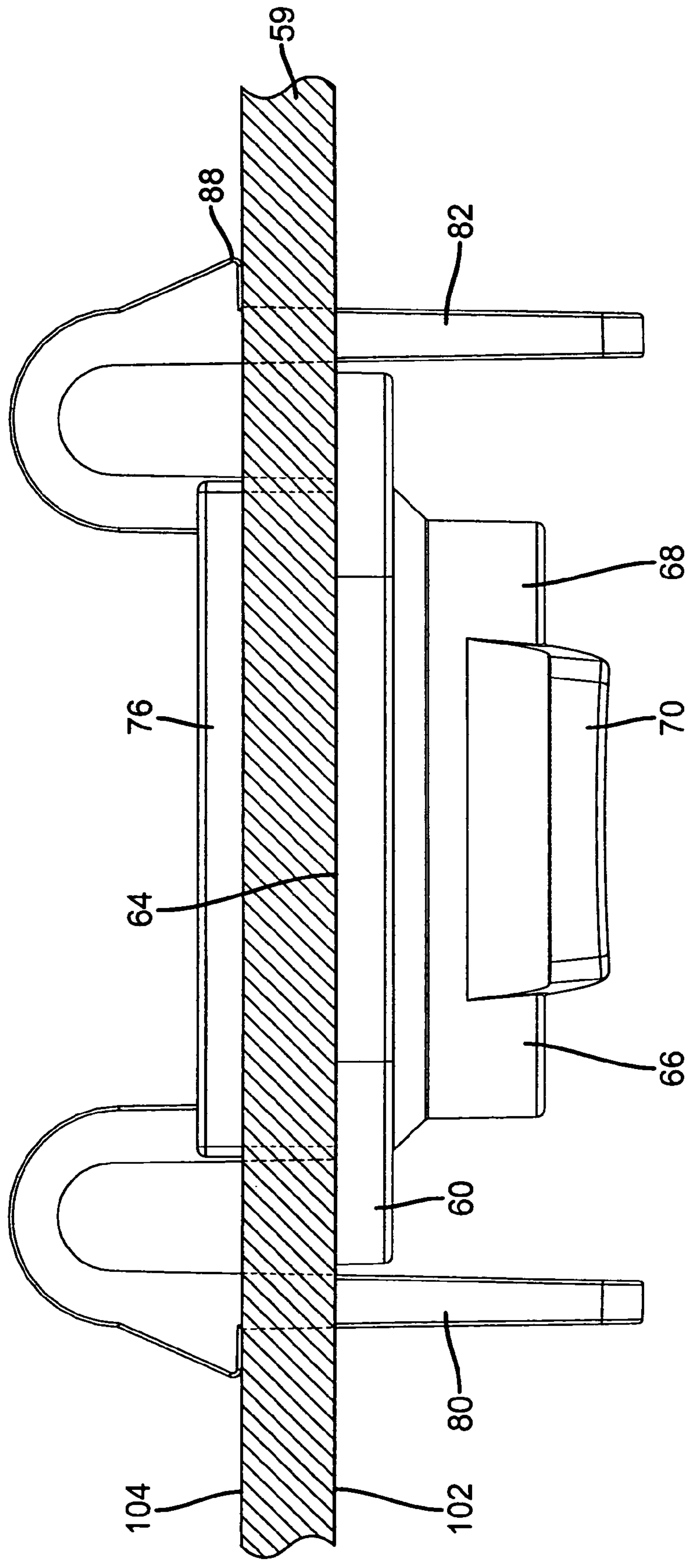
FIG. 6 illustrates a cross-sectional view of the bearing retainer of FIGS. 2-4 installed within an opening.

FIG. 6 is cross-sectional view of bearing retainer 50 installed within opening 58. As illustrated, rear surface 64 of flange 60 contacts exterior surface 102 of endplate 59 and retainer tabs 84, 86, 88, and 90 (only retainer tabs 86 and 90 are shown) contact an interior surface 104 of endplate 59.

Figure 7:
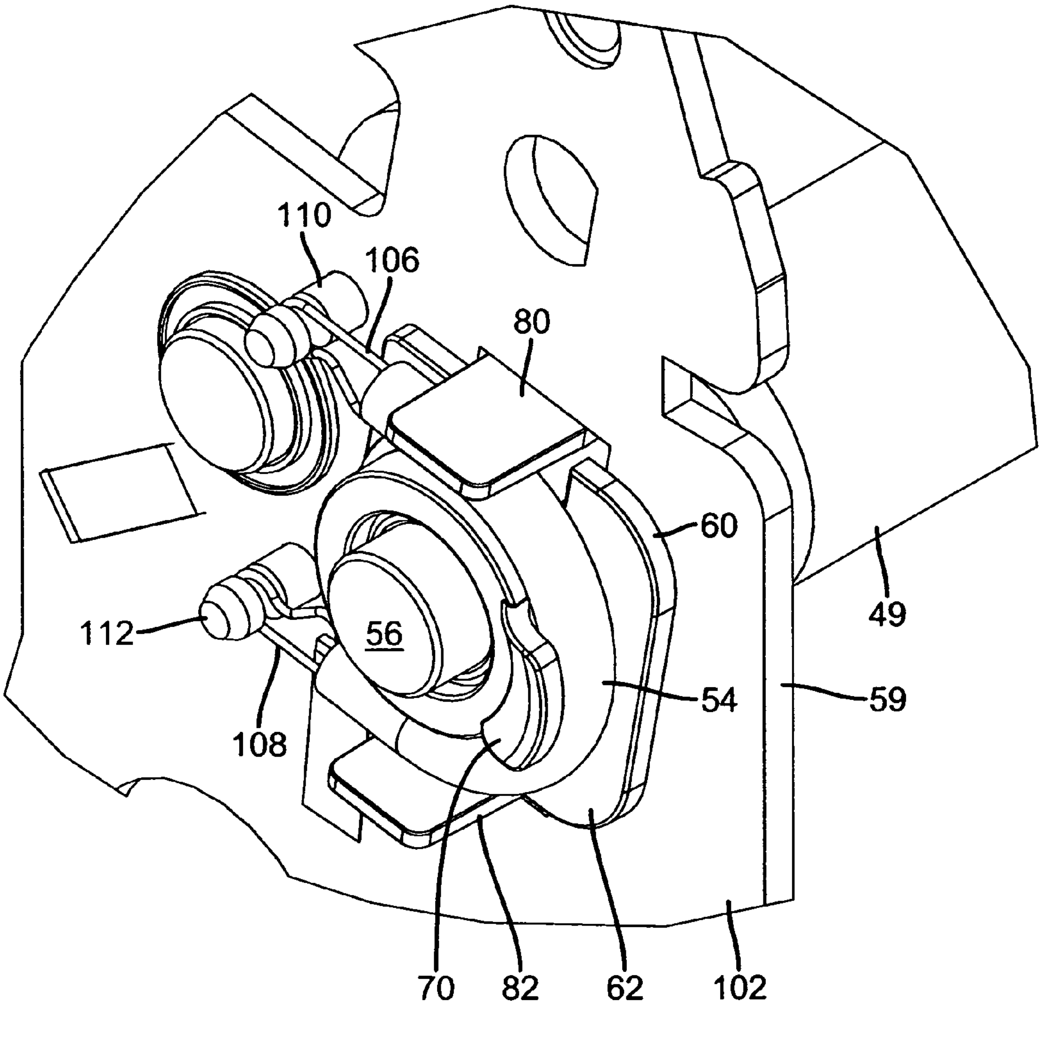
FIG. 7 illustrates a front perspective view of the idler wheel system of FIG. 2 in an installed configuration.
Figure 8:
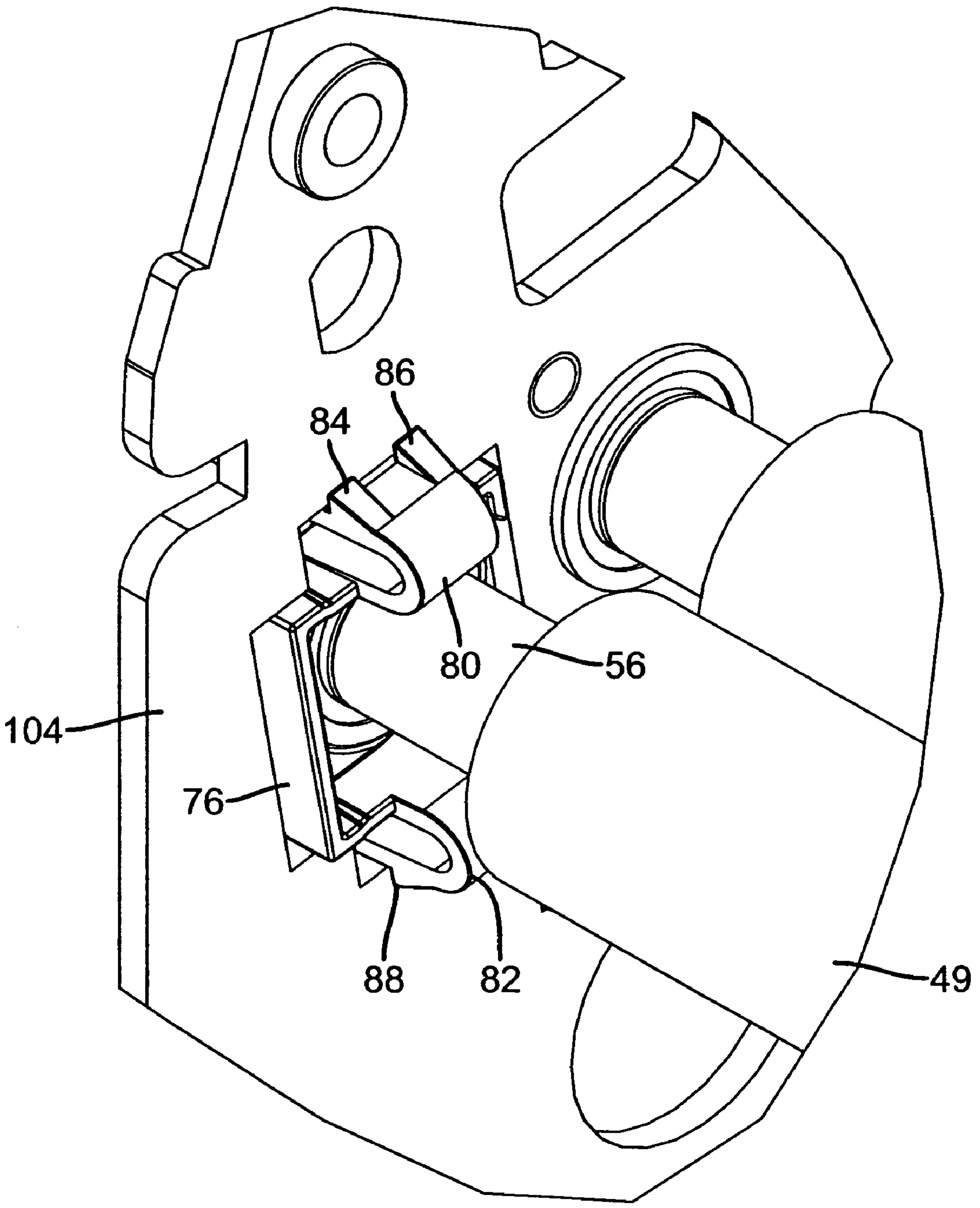
FIG. 8 illustrates a rear perspective view of the idler wheel system of FIG. 2 in an installed configuration.

FIGS. 7 and 8 respectively show front and rear perspective views of endplate 59 illustrating bearing retainer 50 in a secured position within opening 58. With reference to FIG. 7, after bearing retainer 50 is secured within opening 58, extension spring 54 is looped over spring retainer tab 70 and around exterior surface 68 of hub. Extension spring 54 is stretched and retainer loops 106 and 108 on opposite ends of extension spring 54 are hooked over and retained by corresponding anchor posts 110 and 112 extending from exterior surface 102 of endplate 59.

As mentioned above, frame element 76 is configured with a "running" or "sliding" fit within opening 58 whereby the dimensions of frame element 76 are incrementally smaller than the dimensions of opening 58 such that frame element 76 can move, or slide, within opening 58. In one embodiment, for example, frame element 76 has a clearance relative to opening 58 ranging from a minimum of 0.05 mm to a maximum of 0.21 mm. As such, after installing extension spring 54 about exterior surface 68 of hub 66 and stretching and coupling extension spring 54 to anchor posts 110 and 112 via retainer loops 106 and 108, extension spring 54 biases (i.e. pulls) bearing retainer 50 in a direction toward anchor posts 110 and 112, thereby biasing idler roller 49 against drive roller 46.

With reference to FIG. 7, after installation, first and second resilient fingers 80 and 82 extend through corresponding notches 97 and 98 so as to be accessible from the exterior side of endplate 59. As such, bearing retainer 50 can be removed from opening 58 without requiring access to the interior surface of endplate 59 and, thus, without requiring access to an interior of the imaging apparatus of which roller set 44 is a part, such as imaging apparatus 30. However, after installation about hub 66, it is noted that extension spring 54 prevents compression of first and second resilient fingers 80 and 82, thereby preventing inadvertent removal of bearing retainer 50 from opening 58.

By employing a self-securing bearing retainer, such as bearing retainer 50, having integrated resilient fingers with retainer tabs, such as first and second resilient fingers 80, 82 and retainer tabs 84, 86, 88, and 90, to secure the bearing retainer to a structure, an idler wheel assembly according to embodiments of the present invention, such as idler roller assembly 48 eliminates the use of e-rings and the need for corresponding grooves in the idler roller shaft. The self-securing nature of bearing retainer 50 also makes idler roller assembly 48 less cumbersome to assemble than conventional idler roller assemblies. As a result, an idler roller system employing a bearing retainer according to embodiments of the present invention has fewer components and is easier and less costly to assemble and manufacture than conventional idler roller assemblies.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

PARTS LIST

30 Imaging Apparatus
32 Media Supply System
34 Exposure System
36 Processing System
38 Output System
40 Film
42 Transport Path
44 Roller Set
46 Drive Roller
48 Idler Roller Assembly
49 Idler Roller
50 Bearing Retainer
52 Bearing
54 Extension Spring
56 Idler Roller Shaft
58 Opening
59 Endplate
60 Flange
62 Front Surface of Flange

64 Rear Surface of Flange
66 Hub
68 Exterior Surface of Hub
70 Spring Retainer Tab
72 Bearing Pocket
74 Hub Opening
76 Frame Element
80 First Resilient Finger
82 Second Resilient Finger
83 Notch
84 Retainer Tab
85 Notch
86 Retainer Tab
88 Retainer Tab
90 Retainer Tab
92 Distance "D1"
93 Compression Force
94 Compression Force
96 Distance "D2"
97 Notch
98 Notch
100 Distance "D3"
102 Exterior Surface of Endplate
104 Interior Surface of Endplate
106 Retainer Loop
108 Retainer Loop
110 Anchor Post
112 Anchor Post

What is claimed is:

1. A bearing retainer comprising:

a flange having a front surface and a rear surface;

a hub extending from the front surface and having an exterior surface to receive and support a looped extension spring and having an interior forming a bearing pocket; and at least one resilient finger initially extending from the rear surface and having a curve so as to extend toward and beyond the front surface and including at least one retainer tab extending from a surface opposite the hub and positioned on the rear surface side relative to the flange, wherein the resilient finger is configured to be deflectable from a free position toward the hub in response to a deflection force to enable a portion of the resilient finger including the retainer tab to be inserted through an opening in a wall and to substantially return to the free position upon release of the deflection force such that the wall is held between the retainer tab and rear surface, thereby securing the bearing retainer within the opening.

2. The bearing retainer of claim 1, wherein the hub includes a spring retainer flange extending radially outward from an end of the hub opposite the front surface of the flange.

3. The bearing retainer of claim 1, wherein the hub is positioned so as to limit deflection of the at least one resilient retainer finger from the free position to a distance less than a distance which would cause permanent deformation of the least one resilient retainer finger.

4. The bearing retainer of claim 1, comprising a frame element extending from the rear surface, wherein the frame element is configured to extend through the opening when the bearing retainer is secured within the opening and is configured with dimensions to provide a sliding fit within the opening.

5. The bearing retainer of claim 1, wherein the hub is substantially cylindrical in shape.

6. The bearing retainer of claim 1, wherein the at least one resilient finger comprises a first and a second resilient finger positioned diametrically opposite one another relative to the hub.

7. The bearing retainer of claim 1, wherein the at least one resilient finger is substantially perpendicular to the front surface of the flange when in the free position.

8. The bearing retainer of claim 1, wherein the flange includes a notch positioned so as to receive a portion of the at least one resilient finger when the at least one resilient finger is deflected from the free position.

9. The bearing retainer of claim 1, wherein the flange and has at least one dimension greater than a corresponding dimension of the opening in the wall.

10. The bearing retainer of claim 1, wherein the flange is substantially planar in shape.

11. The bearing retainer of claim 1, wherein the bearing pocket is configured to receive and hold a bearing via an opening in the rear surface.

12. The bearing retainer of claim 11, wherein the bearing is configured to receive a shaft via the opening, and wherein the shaft is free to rotate within the bearing.

13. The bearing retainer of claim 1, wherein the bearing pocket is configured as a bearing and is configured to receive a shaft via an opening in the rear surface, and wherein the bearing pocket is configured to support the shaft and to allow rotation of the shaft therein.

14. The bearing retainer of claim 1, wherein the bearing pocket is substantially cylindrical in shape.

15. The bearing retainer of claim 1, wherein the bearing retainer is formed from a single piece of material.

16. The bearing retainer of claim 15, wherein the bearing retainer comprises a plastic material.

17. The bearing retainer of claim 16, wherein the bearing retainer comprises an antistatic polycarbonate.

18. An idler roller assembly comprising:

an idler roller having a shaft;

an extension spring;

a bearing; and a bearing retainer including:

a flange having a front surface and a rear surface;

a hub extending from the front surface and having an exterior surface configured to receive and support the extension spring and having an interior forming a bearing pocket configured to receive and hold the bearing, wherein the bearing is configured the receive shaft via an opening in the rear surface and is configured to support the shaft which is free to rotate therein; and at least one resilient finger initially extending from the rear surface and having a curve so as to extend toward and beyond the front surface and including at least one retainer tab extending from a surface opposite the hub and positioned on the rear surface side relative to the flange, wherein the resilient finger is configured to be deflectable from a free position toward the hub in response to a deflection force to enable a portion of the resilient finger including the retainer tab to be inserted through an opening in a wall and to substantially return to the free position upon release of the deflection force such that the wall is held between the retainer tab and rear surface, thereby securing the bearing retainer within the opening.

19. The idler roller assembly of claim 18, wherein the extension spring is configured to loop around the exterior surface of the hub and to bias the bearing retainer and idler roller in a desired direction.

20. The idler roller assembly of claim 18, wherein the hub includes a spring retainer flange extending radially outward from an end of the hub opposite the front surface of the flange.

21. The idler roller assembly of claim 18, wherein the hub is positioned so as to limit deflection of the at least one resilient retainer finger from the free position to a distance less than a distance which would cause permanent deformation of the least one resilient retainer finger.

22. The idler roller assembly of claim 18, comprising a frame element extending from the rear surface, wherein the frame element is configured to extend through the opening when the bearing retainer is secured within the opening and is configured with dimensions to provide a sliding fit within the opening.

23. An imaging apparatus comprising:

an endplate structure having an opening;

a driven roller;

an idler roller having a shaft;

an extension spring; and a bearing retainer including:

a flange having a front surface and a rear surface;

a hub extending from the front surface and having an exterior surface configured to receive and support the extension spring and having an interior forming a bearing pocket configured to receive and hold the bearing, wherein the bearing is configured the receive shaft via an opening in the rear surface and is configured to support the shaft which is free to rotate therein; and at least one resilient finger initially extending from the rear surface and having a curve so as to extend toward and beyond the front surface and including at least one retainer tab extending from a surface opposite the hub and positioned on the rear surface side relative to the flange, wherein the resilient finger is configured to be deflectable from a free position toward the hub in response to a deflection force to enable a portion of the resilient finger including the retainer tab to be inserted through an opening in a wall and to substantially return to the free position upon release of the deflection force such that the wall is held between the retainer tab and rear surface, thereby securing the bearing retainer within the opening.

24. The imaging apparatus of claim 23, wherein opposite ends of the extension spring are selectively coupled to the endplate and the extension spring is configured to loop around the exterior surface of the hub and to bias the bearing retainer in a direction such that an outer surface of the idler roller is biased against an outer surface of the driven roller so as to create a nip which forms a portion of a transport path along which imaging media is transported through the imaging apparatus.

25. The imaging apparatus of claim 23, wherein the hub is positioned so as to limit deflection of the at least one resilient retainer finger from the free position to a distance less than a distance which would cause permanent deformation of the least one resilient retainer finger.

26. The imaging apparatus of claim 23, comprising a frame element extending from the rear surface, wherein the frame element is configured to extend through the opening when the bearing retainer is secured within the opening and is configured with dimensions to provide a sliding fit within the opening.

27. The imaging apparatus of claim 23, wherein the at least one resilient finger comprises a first and a second resilient finger positioned diametrically opposite one another relative to the hub.

28. The imaging apparatus of claim 23, wherein the opening in the endplate structure includes a pair of notches configured to receive the first and second resilient fingers, wherein the first and second resilient fingers have dimensions configured to provide a sliding fit within the corresponding notch.

29. The imaging apparatus of claim 23, wherein the bearing retainer is formed from a contiguous piece of anti-static polycarbonate material.

* * * * *

UNITED STATES PATENT AND TRADEMARK OFFICE

CERTIFICATE OF CORRECTION

PATENT NO. : 7,632,019 B2
APPLICATION NO. : 11/610047
DATED : December 15, 2009
INVENTOR(S) : James R. Gilbertson It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 549 days.

Signed and Sealed this

Second Day of November, 2010

David J. Kappos
*Director of the United States Patent and Trademark Office*